United States Patent Office 3,530,471
Patented Sept. 22, 1970

3,530,471
AUTOMATIC TRACKING RADIO EQUIPMENTS
John Richard Mark, Chelmsford, England, assignor to The Marconi Company Limited, London, England, a British company
Filed Mar. 25, 1968, Ser. No. 715,606
Claims priority, application Great Britain, Apr. 4, 1967, 15,376/67
Int. Cl. G01s 3/56
U.S. Cl. 343—118          8 Claims

ABSTRACT OF THE DISCLOSURE

In known satellite tracking radio equipments, conical scanning gives rise to amplitude modulation of the signals, leading to large tracking errors. In this invention conical scanning is effected by providing a wave guide coupler to combine derived signals corresponding to circularly polarised $TE_{11}$ waves and phase shifted $TM_{01}$ waves. The phase shift is cyclically varied by control voltages from a stepped waveform generator. Mutually perpendicular component tracking signals are taken from the coupler to comparators responding to different phase shifts. These signals are used to maintain correct alignment and track the satellite.

---

Figure 1:
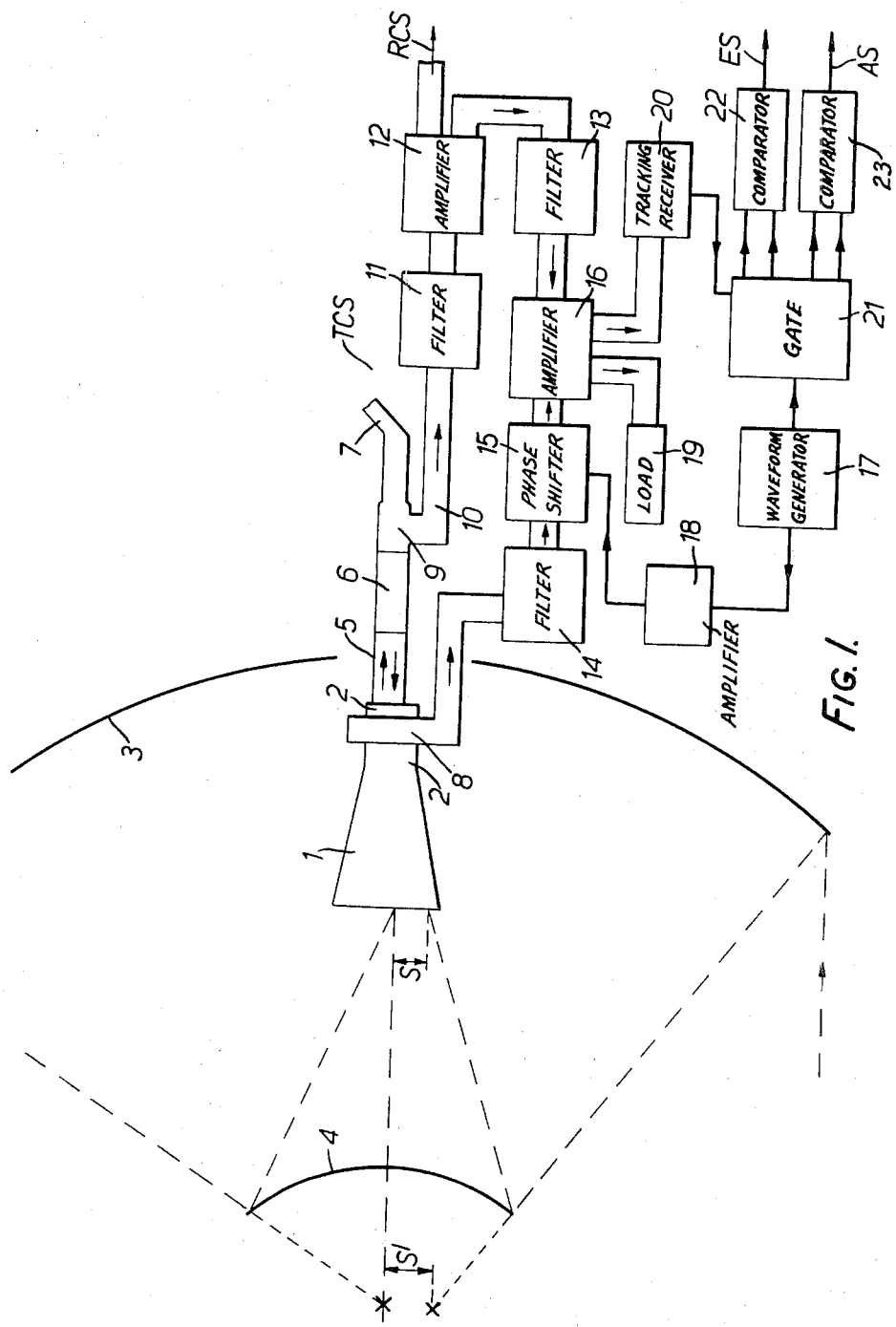

This invention relates to automatic tracking radio equipments i.e. to directional radio equipments which will automatically follow and keep themselves correctly oriented or aligned upon a moving target such as a satellite. Such equipments will hereinafter be referred to, for the sake of brevity, as satellite tracking equipments though obviously they can be designed and used to track other than satellites.

A well known type of satellite tracking equipment uses a paraboloidal reflector in conjunction with an associated single or multiple horn feed, a secondary reflector being often also included in the aerial system, as in the well known Cassegrain aerial system. In the case of arrangements using a multi-horn feed—this commonly consists of four horns at the corners of a square—error signals representative of tracking errors in mutually perpendicular directions (elevation and azimuth) are normally obtained by comparing the signals received on the two pairs of horns comprised in the four, comparison of the signals recieved on the horns of a pair in vertical relationship giving an elevation tracking signal and comparison of the signals received on the other pair of horns being used to derive an azimuth tracking signal. Where only a single horn feed is employed the usual method of obtaining tracking signals is by using what is herein termed conical scanning i.e. by causing the beam to rotate round the surface of a cone, elevation tracking signals being derived by sampling and comparing the signals received when the axis of the rotating beam is vertically above and below the cone axis and azimuth tracking signals being derived by sampling and comparing the signals received when the axis of the rotating beam is horizontally to right and left of the cone axis. Such conical scanning can be achieved in a variety of different ways. One way is by causing the phase centre of the horn to rotate round a circle which is centred on the physical axis of the horn. Another way is by physically rotating an axially asymmetrical secondary reflector in an aerial system having primary and secondary reflectors. The present invention relates to tracking equipments of the kind in which conical scanning is employed and has for its object to provide improved equipments wherein conical scanning is effected by producing rotation of the phase centre of a horn or wave-guide.

A serious defect of most known satellite tracking equipments in which conical scanning is employed is that the aerial beam is scanned at the frequencies employed for communication—normally one frequency is used to provide communication signal transmission from the equipment to the satellite and another is used to provide communication signal reception at the equipment from the satellite—as well as at what is usually called the "beacon" frequency i.e. the tracking frequency determined by the speed of beam rotation around the cone. Scanning at the received communication frequency usually results merely in a comparatively small loss of signal power and, in general, this does not much latter. Scanning at the transmitted communication frequency is, however, much more adversely serious in its effects. Even if there is only small misalignment of the tracking equipment i.e. if there is only a small tracking error, the transmitted communication signal, as rceived at the satellite, will be amplitude modulated due to the scanning. For obvious reasons of economy a satellite is required to carry the maximum possible amount of traffic and this means that the receiving apparatus on a satellite is usually operated well beyond the linear regions of the amplifier and frequency changer responses of that apparatus. Accordingly, if the signals as received at the satellite are amplitude modulated by conical scanning, interaction begtweeng sinals received at and transmitted from the satellite will occur and amplitude modulation of a signal as received will re-appear in the transferred re-transmitted signals. Accordingly it may happen that a particular ground station, the transmitted signal from which is received at the satellite as an amplitude modulated signal, can receive back from the satellite a beacon signal having the same modulation delayed in time. Obviously this can cause large tracking errors and may even (for certain values of delay) make tracking impossible. Such large errors can be avoided by continuously and rapidly changing the scanning frequency over a wide range but this expedient involves very substantial additional complication and expense. Moreover, in those cases in which scanning is effected by physical rotation of some part— e.g. a secondary aerial—rapid change of scanning frequency involves rapid change of rate of rotation and is therefore, for mechanical reasons, objectionable and costly to achieve. Furthermore rapid changing of the scanning frequency is an expedient which merely avoids the large tracking errors above mentioned: it does not eliminate amplitude modulation of the signals as received at the satellite and such amplitude modulation reduces the efficiency of the system and, in some cases, is not permissible.

The present invention seeks to provide conical scanning without involving modulation of either the transmitted or received signals by such scanning.

According to this invention in its broadest aspect conical scanning in a satellite tracking equipment is effected by deriving received beacon signals corresponding to circularly polarised $TE_{11}$ waves; deriving received beacon signals corresponding to $TM_{01}$ waves; combining said derived signals with a relative phase between them which is cyclically changed at a pre-determined beacon frequency; utilising the resultant of combination to derive signals representative of angularly related components of tracking error; and employing said signals to correct for the tracking errors of which they are repesentative.

Accoding to a feature of this invention a satellite tracking equipment comprises means for separating from received signal waves, waves in circularly polarised $TE_{11}$ mode and waves in the $TM_{01}$ mode; a phase shifter of variable phase; means for varying the phase shift of said phase shifter cyclically at a pre-determined beacon frequency; a signal combiner; means for feeding to said combiner signals derived from the two different separated waves through two channels one of which includes said phase shifter; and means for deriving from the output of said combiner signals representative of angularly related components of tracking error, and employing said signals to correct for the tracking errors of which they are representative.

Preferably the phase shifter is cyclically varied in phase shift in successive steps of 90° each and the angular relation between the components is 90°.

Preferably the phase shifter is a voltage controlled phase shifter adapted to provide, in response to successively applied pre-determined voltages from a stepped wave form generator, successive phase shifts each of which differs from the preceding one by 90° and said waveform generator is employed also to control a gating or switching device switching signals derived from the output of the combiner to and between two comparators, the whole arrangement being such that one comparator provides signals representative of components of tracking error in one direction and the other provides signals representative of components of tracking error in a perpendicular direction. The phase shifter is preferably a ferrite phase shifter controlled by the voltage output from the wave form generator.

A preferred embodiment of the invention comprises a radio receiving horn feeding into a first circular waveguide capable of supporting the $TM_{01}$ and $TE_{11}$ modes; a second wave guide fed from the first and capable of supporting only the $TE_{11}$ mode; a circular polariser fed from the second wave guide; a $TM_{01}$ mode coupler for coupling $TM_{01}$ waves out of the first wave guide; a second coupler for coupling circularly polarised $TE_{11}$ waves from a third wave guide fed from the output of the circular polariser; two filters adapted each to pass the beacon frequency present in the outputs from the two couplers; means for feeding signals derived from the outputs of the two filters to a signal combiner through two channels one of which includes a phase shifter which is variable in phase shift in steps of 90° each; a wave form generator for cyclically varying the phase shift of said phase shifter in the aforesaid steps; and a switching or gating device controlled by said wave form generator for switching signals derived from the output of the combiner to and between two comparators, the whole arrangement being such that one comparator provides signals representative of components of tracking error in one direction and the other provides signals representative of components of tracking error in a perpendicular direction. Preferably the third wave guide is arranged to be fed, at the end remote from the circular polariser, with communication signals of a pre-determined frequency for transmission and the $TM_{01}$ coupler feeds through a filter rejecting that frequency both to a receiver for receiving communication signals of a different frequency and to the appropriate one of the aforesaid filters.

The combiner may be a wave guide coupler fed with the outputs from the said two filters through two channels one of which includes the phase shifter and the output from the combiner may be fed to a tracking receiver the output from which is fed via the gating or switching device to the two comparators.

Figure 2:
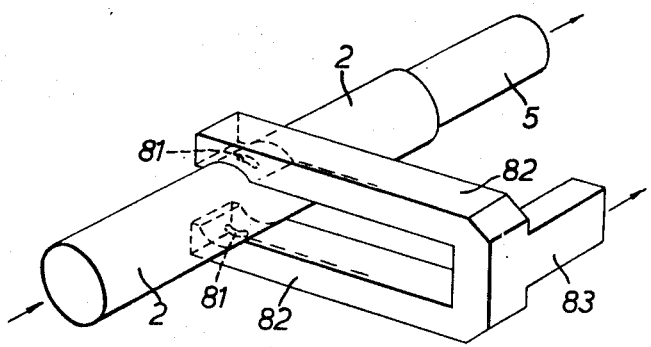
Figure 3:
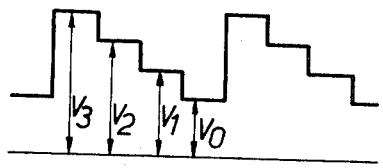
Figure 4:
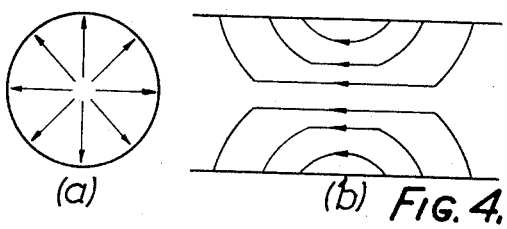
Figure 5:
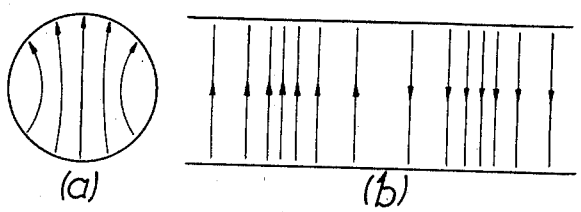

The invention is illustrated in the accompanying drawings in which FIG. 1 is a diagram of one embodiment; FIG. 2 is a perspective view of one form of coupler for use as the coupler 8 of FIG. 1; FIG. 3 shows the wave form of the wave form generator 17 of FIG. 1; and FIGS. 4, 5, 6, 7 and 8 are field and vector diagrams which are employed in explaining the operating principles underlying the invention.

Referring to FIG. 1 the equipment therein shown comprises a receiving tapered horn 1 of circular section which extends into a circular wave guide 2, indicated as integral with the horn, and which is capable of supporting the $TM_{01}$ and $TE_{11}$ modes. Behind the horn is a paraboloidal primary reflector 3 and in front of it is a secondary reflector 4 the horn and reflectors constituting an aerial system of a type well known per se. The wave guide 2 continues into a circular wave give 5 capable of supporting only the $TE_{11}$ mode. In this wave guide is a circular polariser 6 for the $TE_{11}$ mode. A wave guide 7 is provided for enabling a communication signal e.g. on a frequency of 6 gHz. to be transmitted, this signal being fed in as indicated conventionally by the arrow TCS.

$TM_{01}$ mode signals are coupled out from the wave guide 2 by a $TM_{01}$ coupler 8. A suitable form which this coupler may take is separately shown in enlarged perspective view in FIG. 2 which, it is thought, will be found largely self-explanatory. Referring to FIG. 2 the wave guide 2, which can support both the $TM_{01}$ and $TE_{11}$ modes is coupled by slots 81 to two lengths of rectangular wave guide 82 branched out of a rectangular wave guide 83. Beacon and communication signals enter the horn from the reflector aerial system and both the $TM_{01}$ and $TE_{11}$ modes appear in wave guide 2. $TE_{11}$ mode signals pass through wave guide 5 and polariser 6 while $TM_{01}$ mode signals are taken off by the coupler 8. $TM_{01}$ beacon signals related in phase and amplitude with those in the guide 2 appear in guide 83.

Circularly polarised $TE_{11}$ signals appearing at the output side of the circular polariser 6 are branched off by any suitable known form of orthogonal coupler 9 to a wave guide 10 and are fed to a wave guide filter 11 which is dimensioned to reject the frequency used for communication signal transmission (above assumed to be 6 gHz.) and pass the frequency—for example 4 gHz.—used for communication signal reception from the satellite and also the beacon signal frequency. The signals passed by the filter 11 are suitably amplified, preferably by a parametric amplifier 12 and the received amplified communication signals taken off as conventionally indicated by the arrow RCS, for utilisation by any suitable utilisation apparatus (not shown). The received beacon signal is separated out of the output from the amplifier 12 by a suitable wave guide filter 13 and fed in as one input to a wave guide coupler 16.

Returning now to the $TM_{01}$ signal coupled out by the coupler 8 from the wave guide 2, this is passed to a wave guide filter 14 which separates and passes the beacon frequency to a phase shifter 15 which is variable in steps of 90° of the beacon frequency cycle or, to put the matter in terms of time, is variable so as to vary the time delay it provides in steps of $T/4$ where $T$ is the beacon frequency period. The phase shifter 15 is varied by apparatus described below so that it successively imposes delays of $t_0$, $t_0+3T/4$, $t_0+T/2$, $t_0+T/4$, $t_0$ . . . and so on. The output from the phase shifter constitutes the second input to the wave guide coupler 16 which adds the two input signals thereto with a coupling ratio chosen to produce minimum loss for the signal which reaches it from the coupler 8. A coupling value of $-10$ db is satisfactory.

The phase shifter 15 may be a ferrite device as known per se and adapted to give a phase shift which is controllable by a control voltage fed thereto. Thus a phase shift of $\varphi_0$ (corresponding to the time delay of $t_0$) is obtainable when a control voltage of $V_0$ is applied to the phase shifter; a shift of $\varphi_0+3\pi/2$ (corresponding to a time delay of $t_0+3T/4$) results from a control voltage of $V_3$; a shift of $\varphi_0+\pi$ (corresponding to a time delay of $t_0+T/2$) results from a control voltage of $V_2$; and a shift of $\varphi_0+\pi/2$ (corresponding to a time delay of $t_0+T/4$) results from a control voltage of $V_1$. These control voltages are provided by a suitable stepped wave form generator 17 which provides a stepped output wave form as represented graphically in FIG. 3 and the output from which, after amplification by a power amplifier 18 is applied to control the phase shifter 15 cyclically in steps as above described.

The wave guide coupler 16 has the customary terminating wave guide load 19 and its output is fed to a known tracking receiver 20 the output from which is fed via a gating or switching system 21, controlled by the wave form generator 17, to comparators 22 and 23. The gating or switching system 21 is so operated that one comparator compares beacon signal output from the receiver 20 when the phase shift at 15 is of one value with the said output when the phase shift at 15 is of a value differeing from said one value by $\pi$ and the other comparator compares the output obtained when the phase shift differs from said one value by $\pi/2$ with that obtained when the phase shift differs from said one value by $3\pi/2$. Accordingly one comparator will give an output representing tracking error in elevation and the other will give an output representing tracking error in azimuth and these two mutually pependicular component tracking signals are taken off as represented by the arrows ES and AS and employed, by known means (not shown), automatically to keep the aerial system (horn and reflectors) aligned on the satellite to track it.

In FIG. 1 the phase shifter 15 is shown interposed in the channel between the coupler 8 and the coupler 16. It could, however, be interposed in the channel between the coupler 9 and the coupler 16 and this modification has advantages, as regards tracking sensitivity which may make it preferable in some cases. Better tracking sensitivity is normally available with this modification because the insertion loss of the phase shifter will normally be negligible as compared with the gain of the parametric amplifier 12.

As will be more clearly understood from the theoretical explanation of principles which will be given below, the equipment illustrated by FIG. 1 operates by, in effect, displacing the phase centre of the horn from its physical centre and moving it round said physical centre. Displacement of the horn phase centre by an amount $\delta$ for a polarisation which is parallel to a reference direction, results in a lateral shift by a certain amount S' of the horn image in the secondary reflector 4. Assuming a hyperboloidal secondary reflector 4 of magnification M $S'=S/M$. The direction of the separating distance S from the physical centre shifts by 90° for each step of 90° in the phase shifter 15 and accordingly a rotating beam scan is obtained the effective beam axis rotating in steps of 90° each around the surface of a cone. The actual positions of the steps are determined by the residual phase shift ($\varphi_0$ above) in the phase shifter 15. If, as will normally be the case, $\varphi_0$ is so chosen that the displacement S is in a vertical direction, the effective beam axis will be vertically above and below the physical axis in two alternate steps and to the right and left of it in the other two alternate steps. The image shift is approximately related to the resulting aerial beam scan BS by the expression $$BS=\tan^{-1}(S'/F)$$

where F is the focal length of the primary reflector 3. Thus the lateral shift S of the horn phase centre for the parallel polarisation is directly related to the aerial beam scan.

Figure 6:

A theoretical explanation of the principles of which the invention takes advantage will now be given with reference to the remaining figures of the drawing. FIG. 4(a) and FIG. 4(b) are mutually perpendicular views of the electric field patterns of the $TM_{01}$ mode in a circular wave guide. FIGS. 5(a) and 5(b) similarly show the electric field patterns of the $TE_{11}$ mode. FIG. 6 shows in schematic perspective three electric field patterns for the circularly polarised $TE_{11}$ mode at three planes which are perpendicular to the axis of a circular wave guide and which are spaced apart longitudinally by one quarter of a guided wave length i.e. the three patterns are in time and space quadrature. These patterns also represent those which will exist at a given plane, perpendicular to the guide axis, at time intervals of a quarter of the period of the frequency in the guide. Accordingly the direction of the resultant electric vector, with respect to a chosen reference direction, will vary with time and also be dependent on the position of the reference plane along the guide axis.

Figure 7:
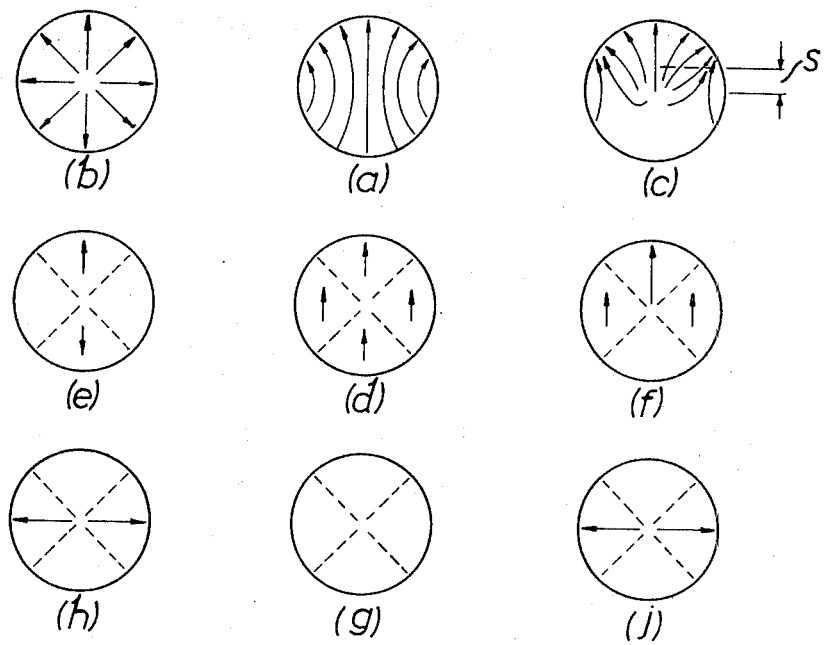

Assume the reference plane to be at the aperture of the horn in FIG. 1 and assume that at a datum time $t_0$ the electric field pattern in a circularly polarised $TE_{11}$ mode in the horn aperture is as shown at (a) in FIG. 7. Assume also that a $TM_{01}$ mode is also present in the aperture. If the relative phase of the circularly polarised $TE_{11}$ mode and the $TM_{01}$ mode is so adjusted that the transverse electric field of the $TM_{01}$ mode is at a maximum in the aperture at the time $t_0$, the $TM_{01}$ field at the aperture may be represented as at (b) in FIG. 7. The resultant combined field will accordingly be more or less as represented at (c) in FIG. 7 with most of the resultant field concentrated in the upper part of the guide so that the horn phase centre is displaced vertically upwards with respect to the physical centre by the vertical distance S. The vertical vectors corresponding to (a) (b) and (c) are shown, for each wave guide quadrant, at (d) (e) and (f) respectively in FIG. 7 and the horizontal vectors corresponding to (a) (b) and (c) are similarly shown, for each quadrant, at (g) (h) and (j) respectively. In FIG. 7(e) to (j) inclusive, the vectors are represented by arrows in the quadrants in which they occur.

Figure 8:
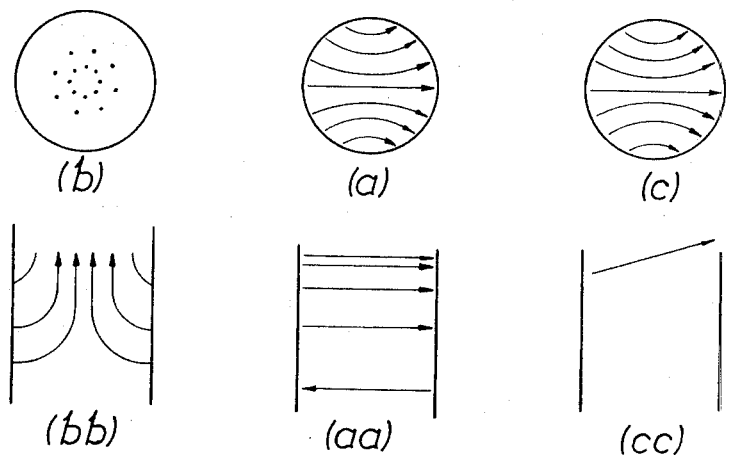

FIG. 8 shows the situation at a quarter of a period of the guided frequency later, i.e. at a time $t_0+T/4$. In FIG. 8(a) and (aa) are, mutually perpendicular views of the circularly polarised $TE_{11}$ mode field; (b) and (bb) are mutually perpendicular views of the $TM_{01}$ mode field and (c) and (cc) are mutually perpendicular views representing the combined resultant field. As will be seen the presence of the $TM_{01}$ mode does not change the field pattern of the $TE_{11}$ mode and introduces no lateral displacement of the horn phase centre but it does introduce a phase error across the aperture. Summarising, the introduction of the $TM_{01}$ mode displaces the horn phase centre for the polarisation which is parallel to the reference direction and also introduces a phase error for the perpendicular polarisation. If the relative phase of the $TM_{01}$ and of the circularly polarised $TE_{11}$ modes is changed by a relative phase shift of a given number of degrees, the reference direction will be rotated through the same angle. Therefore, as will now be seen, changing the relative phase of the two modes—as is in effect done in the equipment of FIG. 1—causes the position of the displaced phase centre for the polarisation parallel to the reference direction to rotate round the physical axis. Accordingly the beam is, in effect, caused to scan in conical fashion and, as will be seen, neither the received nor transmitted communicatiton signals are affected and the scanning does not produce modulation of either of them.

The rate of beam switching i.e. the rate at which the steps of phase shift variation at 15 are gone through, may be chosen at any value between wide limits. To avoid tracking errors the durations of the successive voltages $V_0$, $V_1$, $V_2$, $V_3$, applied to the phase shifter should be identical.

The invention is not limited to the particular arrangement shown in FIG. 1 and other means of carrying out the invention are possible. Thus the $TM_{01}$ mode signals and the $TE_{11}$ mode signals, derived in FIG. 1 by the couplers 8 and 9 respectively, could be received by separate receivers and combined at an intermediate frequency. Also the variable phase delay—introduced in FIG. 1, at radio frequency by the phase shifter 15—could be introduced at an intermediate frequency.

I claim:
1. A tracking equipment comprising means for separating from received signal waves, waves in circularly polarised $TE_{11}$ mode and waves in the $TM_{01}$ mode; a phase shifter of variable phase; means for varying the phase shift of said phase shifter cyclically at a pre-determined beacon frequency; a signal combiner; means for feeding to said combiner signals derived from the two different separated waves through two channels one of which includes said phase shifter; and means for deriving from the output of said combiner signals representative of angularly related components of tracking error.

2. An equipment as claimed in claim 1 wherein the phase shifter is cyclically varied in phase shift in successive steps of 90° each and the angular relation between the components is 90°.

3. An equipment as claimed in claim 1 wherein the phase shifter is a voltage controlled phase shifter adapted to provide, in response to successively applied pre-determined voltages from a stepped wave form generator, successive phase shifts each of which differs from the preceding one by 90° and said waveform generator is employed also to control a gating or switching device switching signals derived from the output of combiner to and between two comparators, the whole arrangement being such that one comparator provides signals representative of components of tracking error in one direction and the other provides signals representative of components of tracking error in a perpendicular direction.

4. An equipment as claimed in claim 3 wherein the phase shifter is a ferrite phase shifter controlled by the voltage output from the wave form generator.

5. An equipment as claimed in claim 4 and comprising a radio receiving horn feeding into a first circular waveguide capable of supporting the $TM_{01}$ and $TE_{11}$ modes; a second wave guide fed from the first and capable of supporting only the $TE_{11}$ mode; a circular polariser fed from the second wave guide; a $TM_{01}$ mode coupler for coupling $TM_{01}$ waves out of the first wave guide; a second coupler for coupling circularly polarised $TE_{11}$ waves from a third wave guide fed from the output of the circular polariser; two filters adapted each to pass the beacon frequency present in the outputs from the two couplers; means for feeding signals derived from the outputs of the two filters to a signal combiner through two channels one of which includes a phase shifter which is variable in phase shift in steps of 90° each; a wave form generator for cyclically varying the phase shift of said phase shifter in the aforesaid steps; and a switching or gating device controlled by said wave form generator for switching signals derived from the output of the combiner to and between two comparators, the whole arrangement being such that one comparator provides signals representative of components of tracking error in one direction and the other provides signals representative of components of tracking error in a perpendicular direction.

6. An equipment as claimed in claim 5 wherein the third wave guide is arranged to be fed, at the end remote from the circular polariser, with communication signals of a predetermined frequency for transmission and the $TM_{01}$ coupler feeds through a filter rejecting that frequency both to a receiver for receiving communication signals of a different frequency and to the appropriate one of the aforesaid filters.

7. An equipment as claimed in claim 6 wherein the combiner is a wave guide coupler fed with the outputs from the said two filters through two channels one of which includes the phase shifter.

8. An equipment as claimed in claim 7 wherein the output from the combiner is fed to a tracking receiver the output from which is fed via the gating or switching device to the two comparators.

References Cited

UNITED STATES PATENTS 3,032,759   5/1962   Ashby _____ 343—16
3,259,899   7/1966   Cook _____ 343—113

RICHARD A. FARLEY, Primary Examiner

R. E. BERGER, Assistant Examiner

U.S. Cl. X.R.
343—113, 117, 858